United States Patent [19]

Fisler

[11] Patent Number: 4,631,368
[45] Date of Patent: Dec. 23, 1986

[54] SWITCHING SYSTEM FOR READILY ACCESSING THE SERVICE LINE FOR TEST BASIC UNIT AND THE SWITCHING SYSTEM FOR READILY ACCESSING THE SERVICE LINE FOR TEST EXPANSION UNIT

[76] Inventor: Alfred E. Fisler, 25872 John Rd., Olmsted Falls, Ohio 44138

[21] Appl. No.: 642,408

[22] Filed: Aug. 20, 1984

[51] Int. Cl.⁴ .............................................. N04B 3/46
[52] U.S. Cl. .................................................... 379/29
[58] Field of Search .................. 179/175.3 R, 175.3 F, 179/175.25

[56] References Cited

U.S. PATENT DOCUMENTS 4,317,967 3/1982 De Vries et al. ............ 179/175.3 R

Primary Examiner—Stafford D. Schreyer

[57] ABSTRACT

The switching for readily accessing the service line for test unit is an electromechanical switching arrangement installed at a subscriber location to enable the subscriber to perform simplified tests to determine if telephone troubles being experienced are the fault of the subscribers own equipment and lines, or of the telephone company equipment and lines.

2 Claims, 2 Drawing Figures

SWITCHING SYSTEM FOR READILY ACCESSING THE SERVICE LINE FOR TEST BASIC UNIT AND THE SWITCHING SYSTEM FOR READILY ACCESSING THE SERVICE LINE FOR TEST EXPANSION UNIT

BACKGROUND

This invention relates to telephony and in particular relates to a fault isolation device for determining whether a fault occurring in a telephone system lies with the local telephone company or in customer-owned telephone equipment.

In conventional customer-owned PBX and KSU systems, there is no provision for isolating the telephone company trunks from the customer-owned equipment, and thus, there is no easy way that the customer can determine whether the problem lies in his equipment or with the phone company.

BRIEF SUMMARY

It is an object of this invention to provide a novel fault isolation device that will enable a customer to isolate telephone system problems.

The Switching System unit(s) are a mechanical switching arrangement consisting of toggle switches, pushbuttons, wiring terminals and a modular jack mounted on a plastic or metal housing which uses a conventional telephone set as a test telephone set.

The Switching System unit(s), when permanently connected in series between the Telco demarcation terminal and the lessee or owner's business telephone system, provides the lessee or owner easy access to each Telco two-wire circuit individually to perform basic tests to determine problem responsibility without having to work with tools or become involved with the wiring. By plugging a conventional telephone set into the modular jack of the Switching System basic unit and following the instructions for each possible problem that may affect the telephone service, the lessee or owner can readily determine if the problem is in his telephone system or is the fault of the Telco supplying the circuit, thereby possibly reducing the time the circuit is out of service and avoiding unnecessary service charges by notifying the correct company for service.

All two-wire circuits can be barged into and/or disconnected from the lessee or owner's business telephone system by operating the two toggle switches associated with each circuit. Monitoring can be accomplished on each circuit by operating the monitor switch before connecting the test telephone set to the circuit. Two non-locking pushbuttons are used to perform tests on ground start Telco circuits normally used on PBX systems.

The input cable pairs connect to the originating end of the circuit, which would be the Telco circuit providing access to their dialing network or to the lessee or owner's telephone system when the circuit is an off-premise station.

DESCRIPTION

Figure 1:
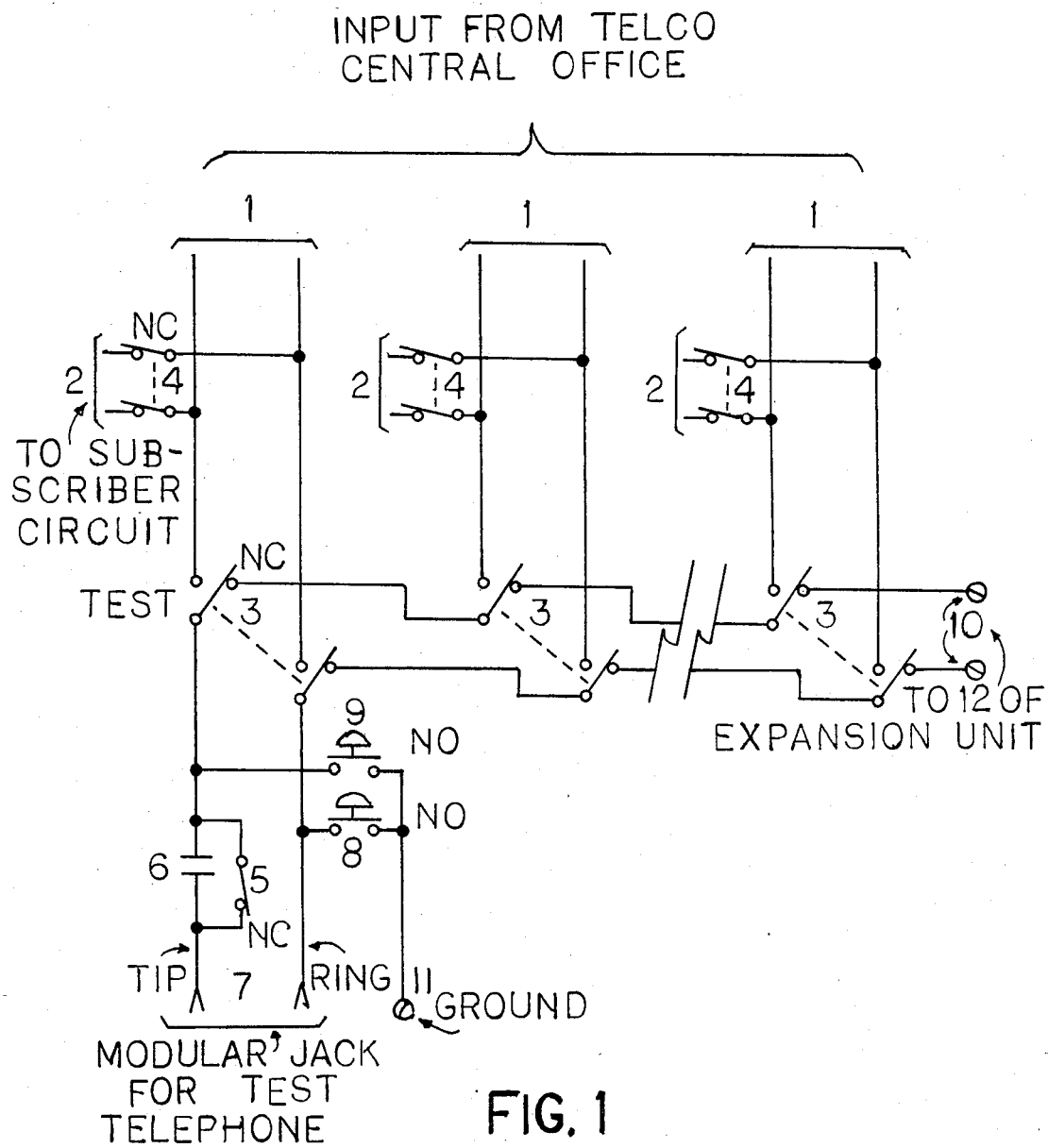
FIG. 1 is the wiring arrangement of the Switching System for Readily Accessing The Service Line For Test basic unit.
Figure 2:
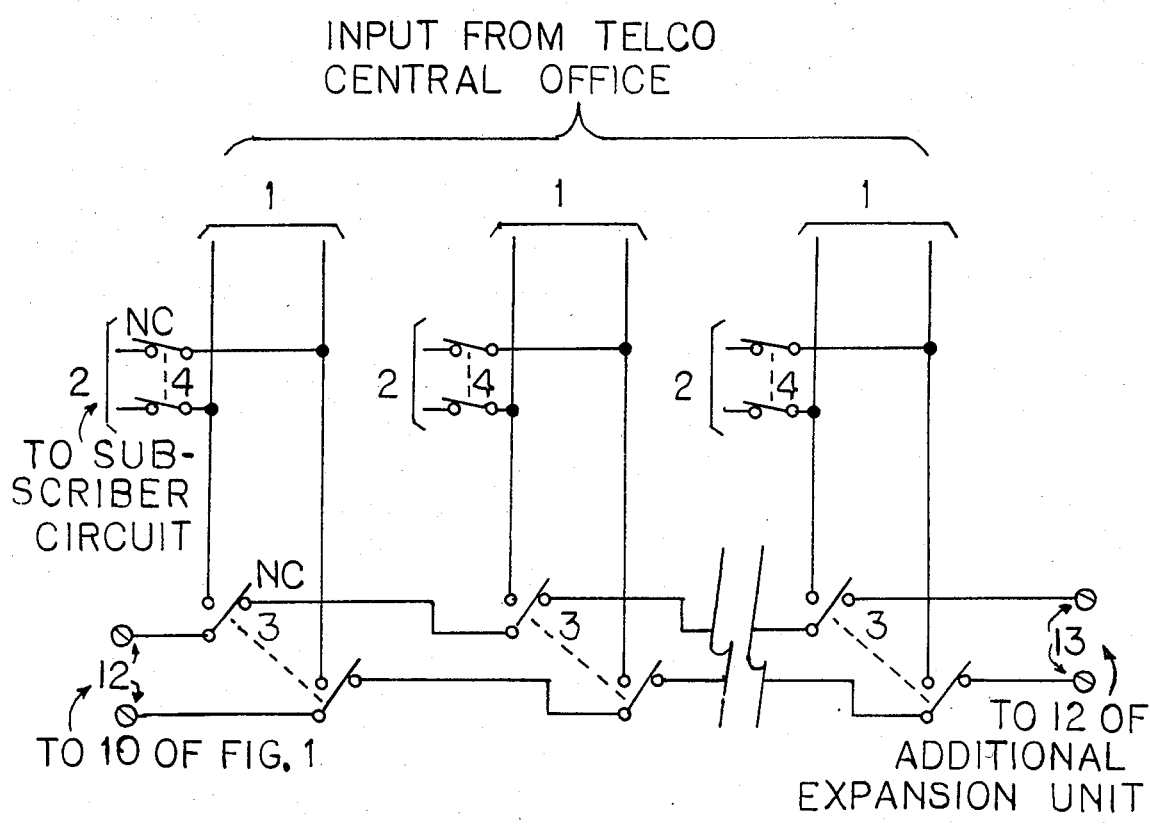
FIG. 2 is the wiring arrangement of the Switching System For Readily Accessing The Service Line For Test expansion unit.

The Switching System For Readily Accessing The Service Line For Test unit(s) is a switching arrangement designed to be installed in line between a user's multi-line telephone system and various two-wire circuits which normally connect to the user3 s multi-line telephone system.

The components are mounted on a plastic or metal housing suitable for wall or desk top mounting. A suggested location for this device would be near the user's telephone system, but it can be located elsewhere by extending the cabling. The Switching System For Readily Accessing The Service Line For Test unit(s) arranges for the requirements of the small multi-line telephone system as well as the larger systems by the addition of expansion units.

By plugging a conventional single line telephone set (equipped with the proper dial) into the modular jack mounted on the Switching System For Readily Accessing The Service Line For Test basic unit, the user can perform the same function normally performed by a telephone service person such as disconnecting and reconnecting the terminating end of a circuit, connecting the test telephone to a circuit, barging in on a circuit, monitoring a circuit, and applying a ground condition to either the tip or ring conductors of a two-wire circuit to determine if a service affecting condition is caused by the user's telephone system or the two-wire circuit.

The components and their functions are as follows:

A double throw, double pole toggle switch 3 is assigned to each two-wire circuit. Its function is to connect the test telephone to the circuit being tested. The wiring arrangement to toggle switches 3 prevents the test telephone from connecting to more than one circuit at a time. This toggle switch 3 also converts the test telephone to an emergency telephone for calling out if the user's telephone system becomes totally inoperative.

A double pole, single throw toggle switch 4 is assigned to each two-wire circuit. Its function is to disconnect and reconnect the two-wire circuit when performing tests.

A single pole, single throw toggle switch 5 places the test telephone in a monitoring mode by inserting the 2.0 MF capacitor in series with the tip side of the chaining circuit to the test telephone.

A momentary push-button 9 applies a ground condition to the tip conductor of a circuit.

A momentary push-button 8 applies a ground condition to the ring conductor of a circuit.

A binding post 11 connects a ground from the user's telephone system to the momentary push-buttons 8 & 9.

Two binding posts 10 on the Switching System basic unit extend the test telephone circuitry to a Switching System expansion unit when required. Binding posts on the Switching System expansion units continue the test telephone chaining circuitry as needed.

A modular jack 7 is provided on the Switching System basic unit to connect the test telephone.

An input cable containing five cable pairs 1 connects to the originating two-wire circuit.

An output cable containing five cable pairs 2 connects the originating two-wire circuit to the terminating end of the circuit.

The procedure to be used by the subscriber in using the device to test his system will now be outlined.

SWITCHING SYSTEM FOR READILY ACCESSING THE SERVICE LINE FOR TEST PROCEDURES

NO DIAL TONE ON LOOP START LINES (Normally Used On Key Systems)

1. Determine line status by monitoring.
2. Move switches 4 and 3 to the test position.
3. Lift handset. If dial tone does not appear, the Telco is at fault.
4. Duplicate test on a working line before reporting problem.
5. Restore all switches to the normal position.

CANNOT DIAL OUT - GETS WRONG NUMBERS LOOP START LINES

1. Perform Steps 1, 2 and 3 of the NO DIAL TONE test for loop start lines.
2. After dial tone appears, dial the numbers you were having problems with. If the dialing problems continue, the Telco is at fault.
3. Duplicate test on a working line before reporting problem.
4. Restore all switches to the normal position.

NO DIAL TONE ON GROUND START LINES (Normally Used On PBX Systems)

1. Determine line status by monitoring.
2. Move switches 4 and 3 of the problem line to the test position.
3. Lift handset. Line should remain dead. (If dial tone had appeared, it indicates trouble on the Telco line or the line is not arranged for ground start operation by the Telco.) Verify the line type before reporting it to the Telco.
4. If line remained dead as mentioned in Step 3, depress pushbutton #8 for a few seconds or until dial tone appears. If dial tone did not appear, the Telco is at fault.
5. If dial tone did appear, move switch 5 to the test position and depress pushbutton #9. If dial tone appeared while depressing pushbutton #9, it indicates the line has been reversed by the Telco. (The dial tone only remains while the pushbutton is depressed when switch 5 is in the test position.)
6. Duplicate test on a working line before reporting problem.
7. Restore all switches to the normal position.

CANNOT DIAL OUT - GETS WRONG NUMBERS GROUND START LINES

1. Perform Steps 1, 2, 3 and 4 of the NO DIAL TONE test for ground start lines.
2. After dial tone appears, dial the numbers you were having problems with. If the dialing problems continue, the Telco is at fault.
3. Duplicate the test on a working line before reporting problem.
4. Restore all switches to the normal position.

CANNOT HEAR OR BE HEARD ON A CALL

Person experiencing problem should remain on the call and not hang up. Person familiar with the Switching System For Readily Accessing The Service Line For Test unit should perform the following steps:

1. Move switch 3 of the problem line to the test position and lift the handset. You should be barged in on the call.
2. Move switch 4 to the test position. (This will disconnect your fellow employee from the call.) If hearing or being heard is still a problem, the Telco is at fault.
3. Duplicate test on a working line before reporting problem.
4. Restore all switches to the normal position.

STATIC-NOISE-CROSSTALK

Perform the same test procedures used for CANNOT HEAR OR BE HEARD.

CALLS NOT RINGING IN-CALLER HEARS RINGING

On Telco circuits where only one number is assigned to a rotary group of lines, finding the line that doesn't ring in requires busying out lines after they have rung in to route the ringing to the problem line. This can be accomplished at a multi-button telephone or an attendant console where all of the Telco lines can be directly accessed. Access a line and dial your main number and after it rings in, put it on HOLD and repeat the process until it fails to ring in. When this happens, DO NOT HANG UP. Leave the handset off hook and go to the Switching System For Readily Accessing The Service Line For Test unit.

On telephone systems where neither the attendant console or multibutton telephones have direct access to all of the Telco lines, you can route the ringing to the problem line by dialing in from various extensions and having the attendant put the calls on hold and you leave the extensions off hook until it fails to ring in. When this happens, DO NOT HANG UP. Leave the handset off hook and go to the Switching System For Readily Accessing The Service Line For Test unit.

On Telco circuits where each line has been assigned a number, access a line and dial each number until it fails to ring in. When this happens, DO NOT HANG UP. Leave the handset off hook and go to the Switching System For Readily Accessing The Service Line For Test unit.

AT THE SWITCHING SYSTEM FOR READILY ACCESSING THE SERVICE LINE FOR TEST UNIT

1. DO NOT PICK UP THE HANDSET OF THE TEST TELEPHONE.
2. Move switch 3 of the problem line to the test position. Test telephone should ring. If it does not ring, check to see if ringing can be heard on the telephone used to call in. Then check the other lines by moving the 3 switches one at a time. ONLY ONE 3 SWITCH CAN BE IN THE TEST POSITION AT A TIME. If the test telephone did not ring, the Telco is at fault.
3. Duplicate test on a working line before reporting problem.
4. Restore all switches to the normal position.

CALLS NOT RINGING IN-CALLER DOES NOT HEAR RINGING-RINGING TRIPS

1. Move switches 4 and 3 of the problem line to the test position.
2. Dial in to the problem line from another telephone. If the ringing trips out or ringing cannot be heard, the Telco is at fault.

It is possible for all lines to ring in properly and still have CALLS NOT RINGING IN-CALLER HEARS RINGING. This would be caused by an improperly Telco wired or programmed rotary group. You can check this by placing all but one line in the rotary group on HOLD and accessing the one line and dialing in on it. If the Telco rotary strapping is incorrect, you will hear ringing in the receiver only. If the Telco rotary strapping is correct, you will hear a busy signal.

OFF PREMISE STATION TESTING

NOTE: INPUT AND OUTPUT CABLE PAIRS OF THE SWITCHING SYSTEM FOR READILY ACCESSING THE SERVICE LINE FOR TEST UNIT MUST BE TRANSPOSED AT THE ORIGINATING END OF THE OFF-PREMISE CIRCUIT.

TESTING AT THE ORIGINATING END (Where The PBX Or Key Telephone System Is Located)

1. Move switches 4 and 3 assigned to the off-premise station to the test position.
2. The test telephone is now connected in place of the off-premise station. If the test telephone performs properly as the off-premise station, move switches 4 and 3 back to the normal position and then have someone at the off-premise locations perform the same tests.

TESTING AT THE TERMINATING OR OFF-PREMISE END

1. Move switches 4 and 3 assigned to the off-premise station to the test position. The test telephone is now connected in place of the off-premise station equipment.
2. If the test telephone does not perform properly, the Telco is at fault.

I claim:

1. An electromechanical switching arrangement equipped for testing a plurality of two-wire telephone circuits existing between a plural number of subscriber stations and a plural number of telephone company two-wire lines to a central office, the arrangement comprising:
   an individual double pole single throw, normally closed switch connected at the subscriber premises in series between each of said plurality of two-wire telephone circuits,
   an individual double pole double throw switch with each normally open contact of each switch connected to one or the other line of a respective one of said two-wire lines of said plural number of telephone company two-wire lines,
   an individual normally closed contact of each double pole double throw switch connected to an individual switch arm terminal of a next adjacent of said double pole double throw switches,
   each individual normally closed contact of a last of said double pole double throw switches being connected to an individual terminal of a two terminal means for further connection,
   individual switch arm terminals of a first of said adjacent of said double pole double throw switches being connected to two terminals of a modular jack for connection to a standard telephone which is to be used for testing,
   a capacitor inserted in series with a tip line between said modular jack and said first double pole double throw switch,
   a normally closed single pole single throw switch connected in parallel with said capacitor, and
   a respective normal open switch connected in series between each said line between the modular jack and said first double pole double throw switch, and
   a system ground circuit.

2. An expansion unit for use with an electromechanical switching arrangement for testing a plurality of two-wire telephone circuits existing between a plural number of subscriber stations and a plural number of telephone company two-wire lines to a central office, the expansion unit comprising:
   an individual double pole single throw, normally closed switch connected at the subscriber premises in series between each of said plurality of two-wire telephone circuits,
   an individual double pole double throw switch with each normally open contact of each switch connected to one or the other line of a respective one of said two-wire lines of said plural number of telephone company two-wire lines,
   an individual normally closed contact of each double pole double throw switch connected to an individual switch arm terminal to a next adjacent of said double pole double throw switches.
   each individual normally closed contact of a last of said double pole double throw switches being connected to an individual terminal of a two terminal means for further connection,
   individual switch arm terminals of a first of said adjacent of said double pole double throw switches being connected to two terminals of another two terminal means for connection to an electromechanical switching arrangement.

* * * * *